(12) United States Patent
St. Gray et al.

(10) Patent No.: US 12,361,171 B2
(45) Date of Patent: Jul. 15, 2025

(54) DETERMINING RESPONSES TO USER REQUESTS WITH VEHICLE INFORMATION TO ENABLE LEARNING

(71) Applicant: Nissan North America, Inc., Franklin, TN (US)

(72) Inventors: Erik St. Gray, Tacoma, WA (US); Maarten Sierhuis, San Francisco, CA (US); Corey Heath, Scottsdale, AZ (US)

(73) Assignee: Nissan North America, Inc., Franklin, TN (US)

( * ) Notice: Subject to any disclaimer, the term of this patent is extended or adjusted under 35 U.S.C. 154(b) by 271 days.

(21) Appl. No.: 18/162,444

(22) Filed: Jan. 31, 2023

(65) Prior Publication Data
US 2024/0256709 A1  Aug. 1, 2024

(51) Int. Cl.
*G06F 21/62* (2013.01)
*G06F 16/903* (2019.01)

(52) U.S. Cl.
CPC ........ *G06F 21/6254* (2013.01); *G06F 16/903* (2019.01)

(58) Field of Classification Search
CPC .......................... G06F 21/6254; G06F 16/903
See application file for complete search history.

(56) References Cited

U.S. PATENT DOCUMENTS

| | | | |
|---|---|---|---|
| 12,033,091 B2 * | 7/2024 | Allen ..................... | G06Q 30/08 |
| 2014/0244148 A1 * | 8/2014 | Horvitz ................ | G08G 1/0968 |
| | | | 701/119 |
| 2018/0286236 A1 * | 10/2018 | Mazzola ............ | G01C 21/3492 |
| 2020/0041994 A1 * | 2/2020 | Alalao ..................... | H04W 4/40 |
| 2020/0104876 A1 * | 4/2020 | Chintakindi ........... | A61B 5/024 |
| 2020/0133288 A1 * | 4/2020 | Abari .................... | G05D 1/0088 |
| 2020/0193549 A1 * | 6/2020 | Pedersen ................ | G06Q 50/40 |
| 2020/0208998 A1 * | 7/2020 | Xiang ..................... | G06F 16/29 |
| 2020/0209002 A1 * | 7/2020 | Hou ........................ | G06N 20/00 |
| 2020/0216089 A1 * | 7/2020 | Garcia ............. | G06F 16/90332 |
| 2020/0336541 A1 * | 10/2020 | Naderi Alizadeh ..... | H04L 67/12 |
| 2022/0063674 A1 * | 3/2022 | De Francesco ....... | G05D 1/0227 |
| 2022/0180745 A1 * | 6/2022 | Banaei-Kashani ......................... G08G 1/096725 | |
| 2022/0188866 A1 * | 6/2022 | Farmer ................. | G06Q 10/02 |
| 2022/0188867 A1 * | 6/2022 | Farmer ................ | H04W 4/029 |
| 2022/0194403 A1 * | 6/2022 | McFarland, Jr. ...... | G06Q 10/20 |
| 2022/0318759 A1 * | 10/2022 | Tarchala ............... | G06F 16/903 |
| 2023/0282036 A1 * | 9/2023 | Simoudis ................ | G06N 3/08 |

(Continued)

*Primary Examiner* — Stephen T Gundry
(74) *Attorney, Agent, or Firm* — Young Basile Hanlon & MacFarlane, P.C.

(57) ABSTRACT

A system may maintain historical vehicle information, collected from multiple vehicles in a vehicle transportation network, in a historical database. The historical vehicle information for a vehicle may include historical data elements corresponding to data types. The system may receive a user request via a communications network. The system may determine, based on the user request, to respond with a historical data element from the historical database or a current data element from current vehicle information collected from a current vehicle that is active in the vehicle transportation network. The system may return a response to the user request via the communications network. The response may include the historical data element or the current data element.

20 Claims, 11 Drawing Sheets

(56) References Cited

U.S. PATENT DOCUMENTS

| | | | |
|---|---|---|---|
| 2023/0284337 A1* | 9/2023 | Obaidi | H04L 67/535 |
| | | | 701/31.5 |
| 2023/0359336 A1* | 11/2023 | Adenwala | H04W 4/46 |
| 2023/0382391 A1* | 11/2023 | Roberts | G06V 20/597 |
| 2023/0391319 A1* | 12/2023 | Penilla | G08G 1/0116 |
| 2023/0408277 A1* | 12/2023 | Lu | G01C 21/3614 |
| 2024/0029484 A1* | 1/2024 | Benjamin | G07C 5/0808 |
| 2024/0210195 A1* | 6/2024 | St. Gray | G01C 21/3614 |

* cited by examiner

Real Time Data – Vehicle database format

| Vehicle ID | Sensors | Geolocation | Update Time | Update Rate (sec) |
|---|---|---|---|---|
| VIN1 | (list of sensors installed/available on vehicle) | Coordinate | CPU Clock Time | 10 |
| VIN2 | ... | ... | | |

FIG. 7

Stored Data Formats

Maps information

| Data Layer | | | | |
|---|---|---|---|---|
| Type | Data | Region | Date range | Acc. |
| Map | (map data) | Geolocated region covered by map | Dates data collected from | |

Content: Regions could be polygons of geocoordinates in degrees, or cross-referenced to any other format like a grid reference. Regions can also be a point + radius.

Arbitrary purposes like marking data accuracy.

Sensor data

| Data Layer | | | | |
|---|---|---|---|---|
| Type | Data | Region | Time range | Acc. |
| World Model | (world model data) | Geolocated region for this part of world model | Time data collected from | |

FIG. 8

| Request | Response |
|---|---|
| Request to look at/browse available data types | Returns manifest of available data-types (from database) |
| Request to look at vehicles from which data is available | Returns data from Real Time Data table |
| Request for data of a specific kind, including:<br>- Real-time data from a particular vehicle | Sends a request to Data Manager to serve data from that vehicle, and passes on response to user when received |
| Request for data of a specific kind, including:<br>- Historical/stored data collected on the server over time | Returns data from the Stored Data database |

User-facing API receives requests from user-side application (HMI)

DETERMINING RESPONSES TO USER REQUESTS WITH VEHICLE INFORMATION TO ENABLE LEARNING

TECHNICAL FIELD

This disclosure relates generally to vehicles, and more particularly to determining responses to user requests with vehicle information to enable learning.

BACKGROUND

A vehicle, such as an electric vehicle, an internal combustion engine vehicle, or a hybrid vehicle, may traverse a portion of a vehicle transportation network (e.g., a road). While traversing the vehicle transportation network, the vehicle may generate or capture a variety of data, such as locations, directions, dates, times, distances, speeds, and images.

SUMMARY

Disclosed herein are aspects, features, elements, implementations, and embodiments of determining responses to user requests with vehicle information to enable learning.

An aspect of the disclosed embodiments is a method that may include maintaining historical vehicle information, collected from multiple vehicles in a vehicle transportation network, in a historical database. The historical vehicle information for a vehicle may include historical data elements corresponding to data types. The method that may include receiving a user request via a communications network. The method that may include determining, based on the user request, to respond with a historical data element from the historical database or a current data element from current vehicle information collected from a current vehicle that is active in the vehicle transportation network. The method may include returning a response to the user request via the communications network. The response may include the historical data element or the current data element.

Another aspect of the method may include accessing vehicle availability to determine a list of current vehicles that are active in the vehicle transportation network.

In an aspect of the method, the user request may be generated by a first user, and the method may include grouping the first user with a second user and enabling a communication between the first user and the second user based on the grouping.

In an aspect of the method, the user request may be generated by a first user having a lower level of access to the current vehicle information, and the current vehicle may be associated with an operator having a higher level of access to the current vehicle information.

Another aspect of the method may include anonymizing the current data element by removing an identification of the current vehicle associated with the current data element before returning the response.

Another aspect of the method may include invoking a natural language processing engine to process the user request.

In an aspect of the method, the user request may be received through a human machine interface (HMI) configured in a vehicle.

Another aspect of the method may include identifying a query type associated with the user request. The determination may be based on the query type.

In an aspect of the method, the user request may include a request for browsing available data types, browsing current vehicles that are active in the vehicle transportation network, a specific kind of data that is current, or specific kind of data that is historical.

In an aspect of the method, the data types may include map data, weather data, images, sensor data, and trip length.

Another aspect of the method may include processing sensor data about an environment from a vehicle of the multiple vehicles or the current vehicle to generate the historical data element or the current data element.

Another aspect of the disclosed embodiments is an apparatus that may include a memory and a processor configured to execute instructions stored on the memory. The processor may execute the instructions to maintain historical vehicle information, collected from multiple vehicles in a vehicle transportation network, in a historical database. The historical vehicle information for a vehicle may include historical data elements corresponding to data types. The processor may execute the instructions to receive a user request via a communications network. The processor may execute the instructions to determine, based on the user request, to respond with a historical data element from the historical database or a current data element from current vehicle information collected from a current vehicle that is active in the vehicle transportation network. The processor may execute the instructions to return a response to the user request via the communications network. The response may include the historical data element or the current data element.

In an aspect of the apparatus, the processor may be further configured to execute instructions stored in the memory to access vehicle availability to determine a list of current vehicles that are active in the vehicle transportation network.

In an aspect of the apparatus, the user request may be generated by a first user, and the processor may be further configured to execute instructions stored in the memory to group the first user with a second user and enable a communication between the first user and the second user based on the group.

In an aspect of the apparatus, the user request may be generated by a first user having a lower level of access to the current vehicle information, and the current vehicle may be associated with an operator having a higher level of access to the current vehicle information.

In an aspect of the apparatus, the processor may be further configured to execute instructions stored in the memory to anonymize the current data element by removing an identification of the current vehicle associated with the current data element before returning the response.

In an aspect of the apparatus, the processor may be further configured to execute instructions stored in the memory to invoke a natural language processing engine to process the user request.

Another aspect of the disclosed embodiments is a system that may include a fleet of vehicles in a vehicle transportation network, a communications network, and a server configured to execute instructions operable to cause one or more processors to perform operations. The operations may include maintaining historical vehicle information, collected from multiple vehicles in a vehicle transportation network, in a historical database. The historical vehicle information for a vehicle may include historical data elements corresponding to data types. The operations may include receiving a user request via the communications network. The operations may include determining, based on the user request, to respond with a historical data element from the historical database or a current data element from current vehicle information collected from a current vehicle that is active in the vehicle transportation network. The operations may include returning a response to the user request via the communications network. The response may include the historical data element or the current data element.

In an aspect of the system, the operations may include identifying a query type associated with the user request. The determination may be based on the query type.

In an aspect of the system, the operations may include processing sensor data about an environment from a vehicle of the multiple vehicles or the current vehicle to generate the historical data element or the current data element.

Variations in these and other aspects, features, elements, implementations, and embodiments of the methods, apparatus, procedures, and algorithms disclosed herein are described in further detail hereafter.

BRIEF DESCRIPTION OF THE DRAWINGS

The various aspects of the methods and apparatuses disclosed herein will become more apparent by referring to the examples provided in the following description and drawings in which like reference numbers refer to like elements unless otherwise noted.

FIG. 7 is an example of current vehicle information.

FIG. 8 is an example of historical vehicle information.

FIG. 9 is an example of requests and responses.

DETAILED DESCRIPTION

Figure 1:
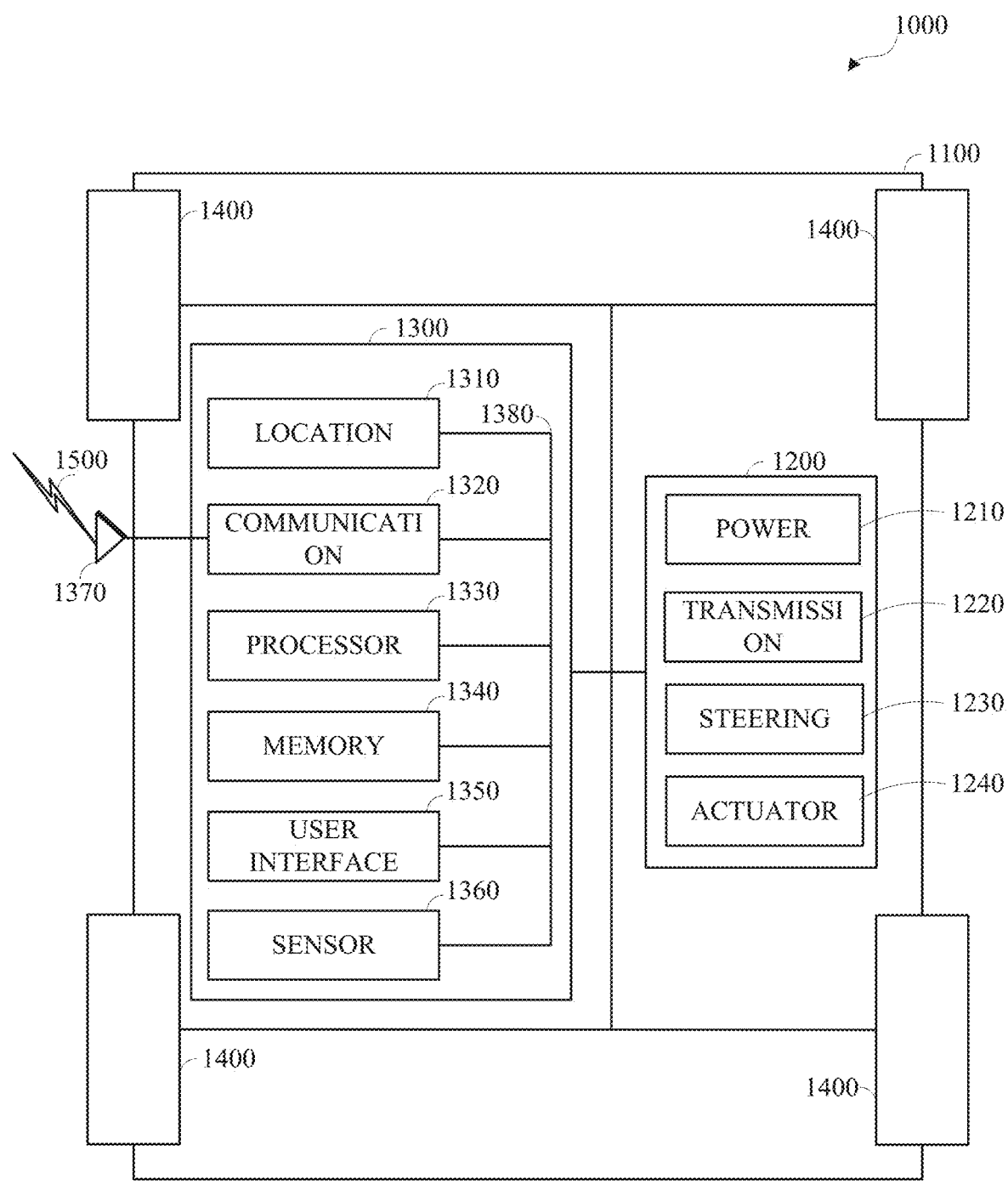
FIG. 1 is a diagram of an example of a vehicle in which the aspects, features, and elements disclosed herein may be implemented.

Conventional systems enable a user to determine information (e.g., traffic, weather, and images) about a location in the world by the user communicating with another user about the information or the user traveling to the location to observe the information. The user or other user may use a vehicle to travel to the location and may observe the information while at the location, including by using a global positioning system (GPS) and cameras. However, conventional systems may be disparate in the information that is shared with users seeking such information. For example, a first user might obtain a first piece of information about a location, such as traffic information, while a second user might obtain a second piece of information about the location, such as weather information. While the first user may benefit from the second piece of information, the first user may not receive the second piece of information unless the first user knows to inquire about it. Also, such information may be obsolete by the time it is received, such as an image of a street where the image is many years old, or the information may be burdensome to receive, such as real time, detailed location information requiring a high bandwidth for transfer. As a result, users may be limited in their ability to receive information about locations in the world.

Implementations of this disclosure address problems such as these by configuring a connected vehicle as a learning or exploration platform for learning about or exploring locations in the world (e.g., to learn about vehicles operating in the world, and about the world via those vehicles). A learner or user (optionally in the vehicle, possibly in a remote location, and optionally part of a class or as an individual) can browse available vehicles as sensor platforms to view the world, can ask questions or query for certain kinds of information, and can look at map data and historical trends derived from vehicle data (e.g., current or historical vehicle information) to determine what drivers do or what the world was like at different times. A teacher or other user can group learners, assign projects, and view learner's activities. Learners can collaborate with one another. Vehicles can also be associated with owners who have privileged access to manage and monitor that vehicle's data. The system may include components that make such implementations possible and convenient, including a query application programming interface (API) with a natural language query generation engine, a set of cloud workers to collect and process vehicle data, and a user management system to manage access and user relationships.

In some implementations, a cloud system can maintain historical vehicle information in a historical database. The historical vehicle information may be collected from multiple vehicles in a vehicle transportation network, such as a fleet of vehicles that are connected to the system. The historical vehicle information may be stored in the historical database. The historical vehicle information for a vehicle may include historical data elements corresponding to data types, such as map data, weather data, images, sensor data, and trip length. The system may receive a user request via a communications network. For example, the user request may be submitted by a user via an HMI which could be in a vehicle, office, classroom, or other environment. The system may determine, based on the user request, to respond with a historical data element from the historical database or a current data element from current vehicle information collected from a current vehicle that is active in the vehicle transportation network. The system may then return a response to the user request, via the communications network, that includes the historical data element or the current data element, based on the determination.

Some implementations may include a database of vehicle content recorded over time; a database including information about vehicles that are active in the world and accessible; a user-facing interface to enable customization and selection of content, and optionally the creation of user-generated content to be sent to the database; a delivery mechanism for content; a set of data managers and API's in the cloud system to serve queries and process data from vehicles, and to create a data store that can be queried; a set of connected vehicles that provide data via their sensors; and a user management logic that controls access, including, user, learner, teacher, and administrator roles. A connected vehicle may be used as a learning or exploration platform about the world: to learn about vehicles operating in the world, and about the world via those vehicles. A learner (optionally in the vehicle, possibly in a remote location, optionally part of a class or as an individual) can browse available vehicles as sensor platforms to see the world, can ask questions or query for certain kinds of information, can look at maps and historical trends derived from vehicle data that tell them about what drivers do or what the world was like at different times. A teacher can group learners, assign projects, and view learner's activities. Learners can collaborate with one another.

The methods and apparatus described herein may be implemented in any vehicle, including an internal combustion engine vehicle, electric vehicle (EV, a hybrid vehicle (e.g., electric and internal combustion engine), autonomous vehicle, or semi-autonomous vehicle. Although described with reference to a vehicle transportation network, the method and apparatus described herein may include the vehicle operating in any area navigable by the vehicle.

FIG. 1 is a diagram of an example of a vehicle in which the aspects, features, and elements disclosed herein may be implemented. In the embodiment shown, a vehicle 1000 includes a chassis 1100, a powertrain 1200, a controller 1300, and wheels 1400. Although the vehicle 1000 is shown as including four wheels 1400 for simplicity, any other propulsion device or devices, such as a propeller or tread, may be used. In FIG. 1, the lines interconnecting elements, such as the powertrain 1200, the controller 1300, and the wheels 1400, indicate that information, such as data or control signals, power, such as electrical power or torque, or both information and power, may be communicated between the respective elements. For example, the controller 1300 may receive power from the powertrain 1200 and may communicate with the powertrain 1200, the wheels 1400, or both, to control the vehicle 1000, which may include accelerating, decelerating, steering, or otherwise controlling the vehicle 1000.

The powertrain 1200 shown by example in FIG. 1 includes a power source 1210, a transmission 1220, a steering unit 1230, and an actuator 1240. Any other element or combination of elements of a powertrain, such as a suspension, a drive shaft, axles, or an exhaust system may also be included. Although shown separately, the wheels 1400 may be included in the powertrain 1200.

The power source 1210 includes an engine, a battery, or a combination thereof. The power source 1210 may be any device or combination of devices operative to provide energy, such as electrical energy, thermal energy, or kinetic energy. In an example, the power source 1210 includes an engine, such as an internal combustion engine, an electric motor, or a combination of an internal combustion engine and an electric motor, and is operative to provide kinetic energy as a motive force to one or more of the wheels 1400. Alternatively, or additionally, the power source 1210 includes a potential energy unit, such as one or more dry cell batteries, such as nickel-cadmium (NiCd), nickel-zinc (NiZn), nickel metal hydride (NiMH), lithium-ion (Li-ion); solar cells; fuel cells; or any other device capable of providing energy.

The transmission 1220 receives energy, such as kinetic energy, from the power source 1210, and transmits the energy to the wheels 1400 to provide a motive force. The transmission 1220 may be controlled by the controller 1300, the actuator 1240, or both. The steering unit 1230 controls the wheels 1400 to steer the vehicle and may be controlled by the controller 1300, the actuator 1240, or both. The actuator 1240 may receive signals from the controller 1300 and actuate or control the power source 1210, the transmission 1220, the steering unit 1230, or any combination thereof to operate the vehicle 1000.

In the illustrated embodiment, the controller 1300 includes a location unit 1310, an electronic communication unit 1320, a processor 1330, a memory 1340, a user interface 1350, a sensor 1360, and an electronic communication interface 1370. Fewer of these elements may exist as part of the controller 1300. Although shown as a single unit, any one or more elements of the controller 1300 may be integrated into any number of separate physical units. For example, the user interface 1350 and the processor 1330 may be integrated in a first physical unit and the memory 1340 may be integrated in a second physical unit. Although not shown in FIG. 1, the controller 1300 may include a power source, such as a battery. Although shown as separate elements, the location unit 1310, the electronic communication unit 1320, the processor 1330, the memory 1340, the user interface 1350, the sensor 1360, the electronic communication interface 1370, or any combination thereof may be integrated in one or more electronic units, circuits, or chips.

The processor 1330 may include any device or combination of devices capable of manipulating or processing a signal or other information now-existing or hereafter developed, including optical processors, quantum processors, molecular processors, or a combination thereof. For example, the processor 1330 may include one or more special purpose processors, one or more digital signal processors, one or more microprocessors, one or more controllers, one or more microcontrollers, one or more integrated circuits, one or more Application Specific Integrated Circuits, one or more Field Programmable Gate Array, one or more programmable logic arrays, one or more programmable logic controllers, one or more state machines, or any combination thereof. The processor 1330 is operatively coupled with one or more of the location unit 1310, the memory 1340, the electronic communication interface 1370, the electronic communication unit 1320, the user interface 1350, the sensor 1360, and the powertrain 1200. For example, the processor 1330 may be operatively coupled with the memory 1340 via a communication bus 1380.

The memory 1340 includes any tangible non-transitory computer-usable or computer-readable medium, capable of, for example, containing, storing, communicating, or transporting machine readable instructions, or any information associated therewith, for use by or in connection with any processor, such as the processor 1330. The memory 1340 may be, for example, one or more solid state drives, one or more memory cards, one or more removable media, one or more read-only memories, one or more random access memories, one or more disks, including a hard disk, a floppy disk, an optical disk, a magnetic or optical card, or any type of non-transitory media suitable for storing electronic information, or any combination thereof. For example, a memory may be one or more read only memories (ROM), one or more random access memories (RAM), one or more registers, low power double data rate (LPDDR) memories, one or more cache memories, one or more semiconductor memory devices, one or more magnetic media, one or more optical media, one or more magneto-optical media, or any combination thereof.

The communication interface 1370 may be a wireless antenna, as shown, a wired communication port, an optical communication port, or any other wired or wireless unit capable of interfacing with a wired or wireless electronic communication medium 1500. Although FIG. 1 shows the communication interface 1370 communicating via a single communication link, a communication interface may be configured to communicate via multiple communication links. Although FIG. 1 shows a single communication interface 1370, a vehicle may include any number of communication interfaces.

The communication unit 1320 is configured to transmit or receive signals via a wired or wireless electronic communication medium 1500, such as via the communication interface 1370. Although not explicitly shown in FIG. 1, the communication unit 1320 may be configured to transmit, receive, or both via any wired or wireless communication medium, such as radio frequency (RF), ultraviolet (UV), visible light, fiber optic, wireline, or a combination thereof. Although FIG. 1 shows a single communication unit 1320 and a single communication interface 1370, any number of communication units and any number of communication interfaces may be used. In some embodiments, the communication unit 1320 includes a dedicated short range communications (DSRC) unit, an on-board unit (OBU), or a combination thereof.

The location unit 1310 may determine geolocation information, such as longitude, latitude, elevation, direction of travel, or speed, of the vehicle 1000. In an example, the location unit 1310 includes a global positioning system (GPS) unit, such as a Wide Area Augmentation System (WAAS) enabled National Marine-Electronics Association (NMEA) unit, a radio triangulation unit, or a combination thereof. The location unit 1310 can be used to obtain information that represents, for example, a current heading of the vehicle 1000, a current position of the vehicle 1000 in two or three dimensions, a current angular orientation of the vehicle 1000, or a combination thereof.

The user interface 1350 includes any unit capable of interfacing with a person, such as a virtual or physical keypad, a touchpad, a display, a touch display, a heads-up display, a virtual display, an augmented reality display, a haptic display, a feature tracking device, such as an eye-tracking device, a speaker, a microphone, a video camera, a sensor, a printer, or any combination thereof. The user interface 1350 may be operatively coupled with the processor 1330, as shown, or with any other element of the controller 1300. Although shown as a single unit, the user interface 1350 may include one or more physical units. For example, the user interface 1350 may include both an audio interface for performing audio communication with a person and a touch display for performing visual and touch-based communication with the person. The user interface 1350 may include multiple displays, such as multiple physically separate units, multiple defined portions within a single physical unit, or a combination thereof.

The sensors 1360 are operable to provide information that enables the vehicle 1000 to operate as a sensor platform to view and learn about the world. The sensors 1360 may be an array of sensors. The sensors 1360 may provide information about the environment in which the vehicle 1000 operates, including current vehicle information. The sensors 1360 can include, for example, one or more outwardly facing cameras, microphones, light detection and ranging (LiDAR) sensors, ambient light sensors, moisture sensors, accelerometers, gyroscopes, compasses, barometers, and timers, or any sensor, or combination of sensors, that are operable to report information regarding some aspect of the environment in which the vehicle 1000 ravels. The sensors 1360 may be used to capture, in real-time (e.g., while the vehicle 1000 is traveling through an environment), information about the environment, such as landscapes, terrain, buildings, offices, traffic, weather, people in the environment, lights, sounds, animals, distances, and other data about the places where the vehicle 1000 travels. In some implementations, the sensors 1360 may include sensors that are operable to provide information that may be used to control the vehicle. For example, the sensors 1360 may provide information regarding current operating characteristics of the vehicle 1000, including vehicle operational information. The sensors 1360 can further include, for example, a speed sensor, acceleration sensors, a steering angle sensor, traction-related sensors, braking-related sensors, steering wheel position sensors, eye tracking sensors, seating position sensors, or any sensor, or combination of sensors, that are operable to report information regarding some aspect of the current dynamic situation of the vehicle 1000.

The sensors 1360 include one or more sensors that are operable to obtain information regarding the physical environment surrounding the vehicle 1000, such as observational, learning, and/or operational environment information. For example, one or more sensors may detect images, sounds, people, objects, locations, distances, times, weather conditions (e.g., temperatures, pressures, humidity, and ambient light), and traffic conditions (e.g., road geometry, such as lane lines, and obstacles, such as fixed obstacles, vehicles, and pedestrians). The sensors 1360 can be or include one or more cameras or video cameras, laser-sensing systems, infrared-sensing systems, acoustic-sensing systems, weather-sensing systems, or any other suitable type of on-vehicle environmental sensing device, or combination of devices, now known or later developed. In some embodiments, the sensors 1360 and the location unit 1310 are combined.

Although not shown separately, the vehicle 1000 may include a trajectory controller. For example, the controller 1300 may include the trajectory controller. The trajectory controller may be operable to obtain information describing a current state of the vehicle 1000 and a route planned for the vehicle 1000, and, based on this information, to determine and optimize a trajectory for the vehicle 1000. In some embodiments, the trajectory controller may output signals operable to control the vehicle 1000 such that the vehicle 1000 follows the trajectory that is determined by the trajectory controller. For example, the output of the trajectory controller can be an optimized trajectory that may be supplied to the powertrain 1200, the wheels 1400, or both. In some embodiments, the optimized trajectory can be control inputs such as a set of steering angles, with each steering angle corresponding to a point in time or a position. In some embodiments, the optimized trajectory can be one or more paths, lines, curves, or a combination thereof.

One or more of the wheels 1400 may be a steered wheel that is pivoted to a steering angle under control of the steering unit 1230, a propelled wheel that is torqued to propel the vehicle 1000 under control of the transmission 1220, or a steered and propelled wheel that may steer and propel the vehicle 1000.

Although not shown in FIG. 1, a vehicle may include additional units or elements not shown in FIG. 1, such as an enclosure, a Bluetooth® module, a frequency modulated (FM) radio unit, a Near Field Communication (NFC) module, a liquid crystal display (LCD) display unit, an organic light-emitting diode (OLED) display unit, a speaker, or any combination thereof.

The vehicle 1000 may be an autonomous vehicle that is controlled autonomously, without direct human intervention, to traverse a portion of a vehicle transportation network. Although not shown separately in FIG. 1, an autonomous vehicle may include an autonomous vehicle control unit that performs autonomous vehicle routing, navigation, and control. The autonomous vehicle control unit may be integrated with another unit of the vehicle. For example, the controller 1300 may include the autonomous vehicle control unit.

When present, the autonomous vehicle control unit may control or operate the vehicle 1000 to traverse a portion of the vehicle transportation network in accordance with current vehicle operation parameters. The autonomous vehicle control unit may control or operate the vehicle 1000 to perform a defined operation or maneuver, such as parking the vehicle. The autonomous vehicle control unit may generate a route of travel from an origin, such as a current location of the vehicle 1000, to a destination based on vehicle information, environment information, vehicle transportation network information representing the vehicle transportation network, or a combination thereof, and may control or operate the vehicle 1000 to traverse the vehicle transportation network in accordance with the route. For example, the autonomous vehicle control unit may output the route of travel to the trajectory controller to operate the vehicle 1000 to travel from the origin to the destination using the generated route.

Figure 2:
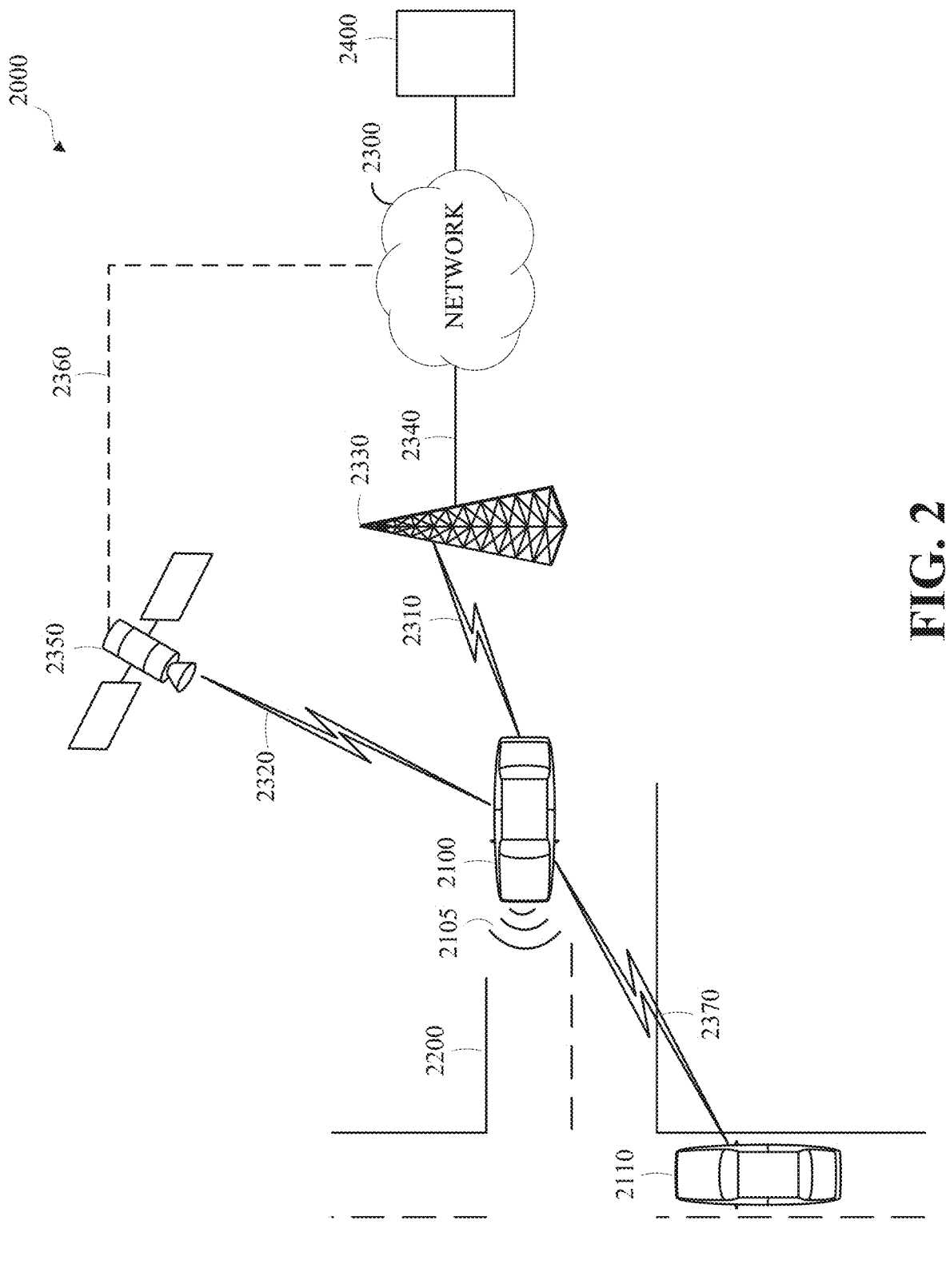
FIG. 2 is a diagram of an example of a portion of a vehicle transportation and communication system in which the aspects, features, and elements disclosed herein may be implemented.

FIG. 2 is a diagram of an example of a portion of a vehicle transportation and communication system in which the aspects, features, and elements disclosed herein may be implemented. The vehicle transportation and communication system 2000 may include one or more vehicles 2100/2110, such as the vehicle 1000 shown in FIG. 1, which travels via one or more portions of the vehicle transportation network 2200, and communicates via one or more electronic communication networks 2300. Although not explicitly shown in FIG. 2, a vehicle may traverse an off-road area.

The electronic communication network 2300 may be, for example, a multiple access system that provides for communication, such as voice communication, data communication, video communication, messaging communication, or a combination thereof, between the vehicle 2100/2110 and one or more communication devices 2400. For example, a vehicle 2100/2110 may receive information, such as information representing the vehicle transportation network 2200, from a communication device 2400 via the network 2300.

In some embodiments, a vehicle 2100/2110 may communicate via a wired communication link (not shown), a wireless communication link 2310/2320/2370, or a combination of any number of wired or wireless communication links. As shown, a vehicle 2100/2110 communicates via a terrestrial wireless communication link 2310, via a non-terrestrial wireless communication link 2320, or via a combination thereof. The terrestrial wireless communication link 2310 may include an Ethernet link, a serial link, a Bluetooth link, an infrared (IR) link, an ultraviolet (UV) link, or any link capable of providing for electronic communication.

A vehicle 2100/2110 may communicate with another vehicle 2100/2110. For example, a host, or subject, vehicle (HV) 2100 may receive one or more automated inter-vehicle messages, such as a basic safety message (BSM), from a remote, or target, vehicle (RV) 2110, via a direct communication link 2370, or via a network 2300. The remote vehicle 2110 may broadcast the message to host vehicles within a defined broadcast range, such as 300 meters. In some embodiments, the host vehicle 2100 may receive a message via a third party, such as a signal repeater (not shown) or another remote vehicle (not shown). A vehicle 2100/2110 may transmit one or more automated inter-vehicle messages periodically, based on, for example, a defined interval, such as 100 milliseconds.

Automated inter-vehicle messages may include current or historic vehicle information, such as detected images, sounds, people, objects, locations, distances, times, weather conditions, and traffic conditions, vehicle identification information, geospatial state information, such as longitude, latitude, or elevation information, geospatial location accuracy information, kinematic state information, such as vehicle acceleration information, yaw rate information, speed information, vehicle heading information, braking system status information, throttle information, steering wheel angle information, or vehicle routing information, or vehicle operating state information, such as vehicle size information, headlight state information, turn signal information, wiper status information, transmission information, or any other information, or combination of information, relevant to the transmitting vehicle state. For example, transmission state information may indicate whether the transmission of the transmitting vehicle is in a neutral state, a parked state, a forward state, or a reverse state.

The vehicle 2100 may communicate with the communications network 2300 via an access point 2330. The access point 2330, which may include a computing device, is configured to communicate with a vehicle 2100, with a communication network 2300, with one or more communication devices 2400, or with a combination thereof via wired or wireless communication links 2310/2340. For example, the access point 2330 may be a base station, a base transceiver station (BTS), a Node-B, an enhanced Node-B (eNode-B), a Home Node-B (HNode-B), a wireless router, a wired router, a hub, a relay, a switch, or any similar wired or wireless device. Although shown as a single unit here, an access point may include any number of interconnected elements.

The vehicle 2100 may communicate with the communications network 2300 via a satellite 2350, or other non-terrestrial communication device. The satellite 2350, which may include a computing device, is configured to communicate with a vehicle 2100, with a communication network 2300, with one or more communication devices 2400, or with a combination thereof via one or more communication links 2320/2360. Although shown as a single unit here, a satellite may include any number of interconnected elements.

An electronic communication network 2300 is any type of network configured to provide for voice, data, or any other type of electronic communication. For example, the electronic communication network 2300 may include a local area network (LAN), a wide area network (WAN), a virtual private network (VPN), a mobile or cellular telephone network, the Internet, or any other electronic communication system. The electronic communication network 2300 uses a communication protocol, such as the transmission control protocol (TCP), the user datagram protocol (UDP), the internet protocol (IP), the real-time transport protocol (RTP) the HyperText Transport Protocol (HTTP), or a combination thereof. Although shown as a single unit here, an electronic communication network may include any number of interconnected elements.

The vehicle 2100 may operate as a sensor platform to view the world. The vehicle 2100 may identify a portion or condition of the environment (e.g., the vehicle transportation network 2200), such as landscapes, terrain, buildings, offices, traffic, weather, people in the environment, lights, sounds, animals, distances, and other data. For example, the vehicle includes at least one on-vehicle sensor 2105, like the sensors 1360 shown in FIG. 1, which may be or include an outwardly facing camera, microphone, LiDAR, ambient light sensor, or moisture sensor, an accelerometer, a gyroscope, a compass, a barometer, a timer, a speed sensor, a wheel speed sensor, an optical sensor, a laser sensor, a radar sensor, a sonic sensor, or any other sensor or device or combination thereof capable of determining or identifying a portion or condition of the environment (e.g., the vehicle transportation network 2200). In some implementations, the sensor data may include lane line data, remote vehicle location data, or both.

The vehicle 2100 may traverse a portion or portions of the vehicle transportation network 2200 using information communicated via the network 2300, such as information representing the vehicle transportation network 2200, information identified by one or more on-vehicle sensors 2105, or a combination thereof.

Although FIG. 2 shows one vehicle transportation network 2200, one electronic communication network 2300, and one communication device 2400, for simplicity, any number of networks or communication devices may be used. The vehicle transportation and communication system 2000 may include devices, units, or elements not shown in FIG. 2. Although the vehicle 2100 is shown as a single unit, a vehicle may include any number of interconnected elements.

Although the vehicle 2100 is shown communicating with the communication device 2400 via the network 2300, the vehicle 2100 may communicate with the communication device 2400 via any number of direct or indirect communication links. For example, the vehicle 2100 may communicate with the communication device 2400 via a direct communication link, such as a Bluetooth communication link.

Figure 3:
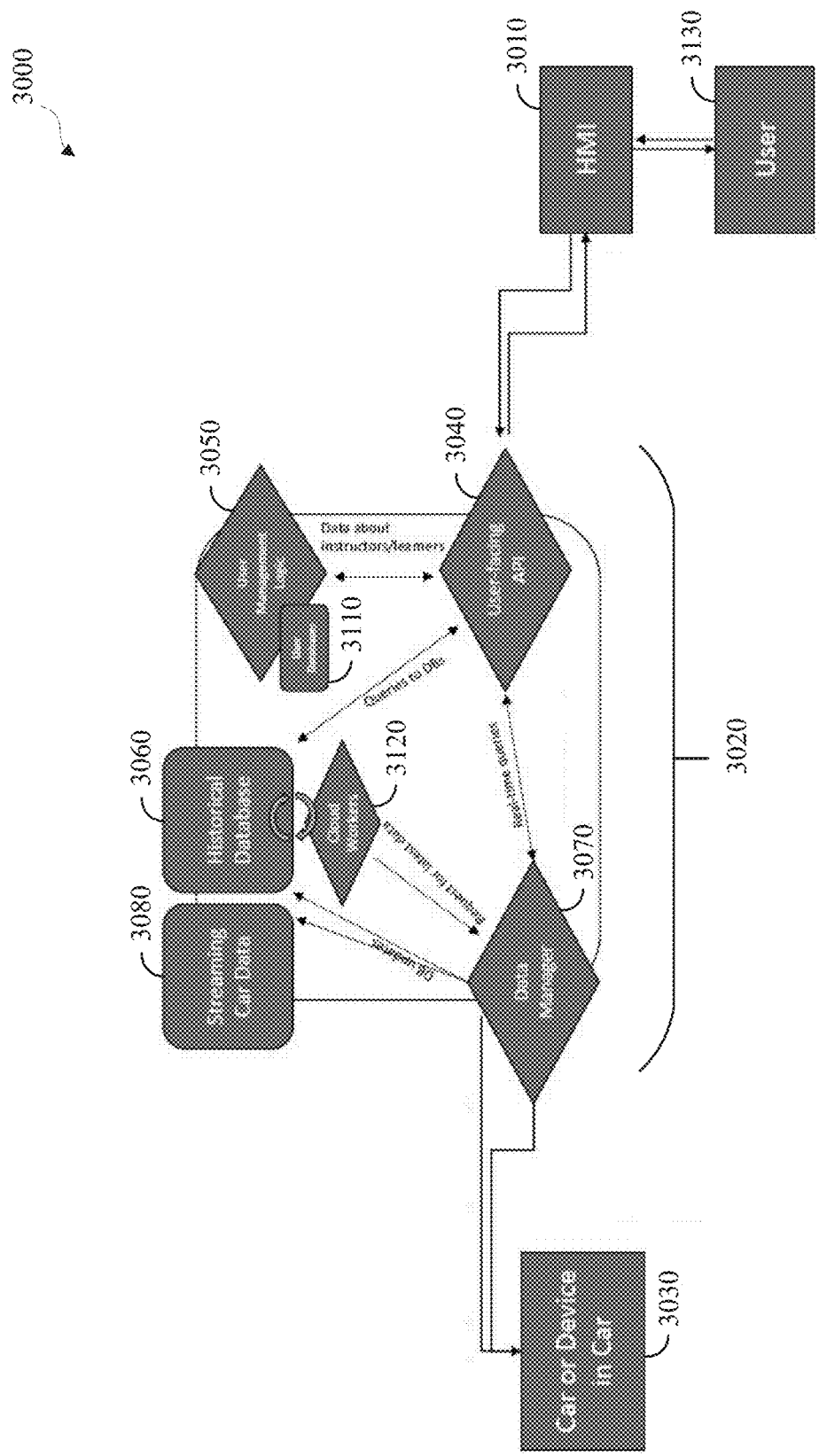
FIG. 3 is a block diagram of an example of a system for determining responses to user requests with vehicle information to enable learning.

FIG. 3 is a block diagram of an example of a system 3000 for determining responses to user requests with vehicle information to enable learning. The system 3000 may utilize vehicles, like the vehicle 1000, as sensor platforms to view and learn about the world. The system 3000 may include an HMI 3010, a cloud system 3020, and a vehicle 3030. The HMI 3010 could be configured in another vehicle like the vehicle 3030, or could be configured in another environment, such as an office, a classroom, or other environment. The vehicle 3030 could be a vehicle in a vehicle transportation network, like the vehicle 2100/2110 in the vehicle transportation network 2200. The vehicle 3030 could be one of many vehicles in a fleet of vehicles connected to the cloud system 3020. While a vehicle is sometimes referred to generically as a "car," other possible vehicles may include trucks, sport utility vehicles, motorcycles, and other classes of vehicle. The cloud system 3020 may include a user-facing API 3040, user management logic 3050, a historical database 3060, a data manager 3070, and a streaming database 3080 for current vehicle information. The user management logic 3050 may utilize one or more additional databases for its operation, such as a user database 3110. The cloud system 3020 may also include cloud workers 3120 for executing tasks in the cloud system 3020.

The cloud system 3020 can maintain historical vehicle information in the historical database 3060. The historical vehicle information may be collected from vehicles in the vehicle transportation network, which may or may not include the vehicle 3030. The historical vehicle information may be stored in the historical database 3060. For example, the historical vehicle information may include information about environments, such as landscapes, terrain, buildings, offices, traffic, weather, people in the environment, lights, sounds, animals, distances, and other data about the places where the vehicles travel. The historical vehicle information for a vehicle may include historical data elements corresponding to data types, such as map data, weather data, images, sensor data, and trip length, which may be collected from sensors like the sensor 1360. The cloud system 3020 may receive a user request (e.g., query) from a user 3130 (e.g., a learner) via a communications network, such as the communications network 2300. The user request may be submitted by the user 3130 via the HMI 3010. For example, the user request may be a request for data, user ratings, or user-generated content, which may be uploaded to the historical database 3060.

The user request may be transmitted to the cloud system 3020 and served by the user-facing API 3040. The cloud system 3020, via the user-facing API 3040, may query the user management logic 3050 to obtain information about the user 3130 (e.g., stored in the user database 3110). For example, the user management logic 3050 obtain information to determine whether users, such as the user 3130, are learners or teachers, whether the learners are part of certain groups led by teachers, and which groups the teachers lead. The cloud system 3020, via the user-facing API 3040, may then determine, based on the user request, to respond to the user 3130 with a historical data element from the historical database 3060 or a current data element from current vehicle information (e.g., via the streaming database 3080). The current vehicle information may be collected from a current vehicle that is active in the vehicle transportation network, such as the vehicle 3030, and may be collected from sensors like the sensor 1360. For example, the current vehicle information may include real-time information about an environment, such as a landscape, terrain, buildings, offices, traffic, weather, people in the environment, lights, sounds, animals, distances, and other data about the place where the vehicles is located. The cloud system 3020, via the user-facing API 3040, may identify a query type associated with the user request, and may make the determination based on the query type. If the cloud system 3020 can respond to the user request with historical vehicle information, then the cloud system 3020 may query the historical database 3060 for the historical vehicle information. However, if the cloud system 3020 is unable to respond to the user request with historical vehicle information, then the cloud system 3020 may query the data manager 3070 for current vehicle information. The data manager 3070 may invoke data processing, specific to the query type, on returned data from the current vehicle (e.g., the vehicle 3030). The cloud system 3020, via the user-facing API 3040, may then return a response to the user request, via the communications network, that includes the historical data element or the current data element, based on the determination. The response may be transmitted to the HMI 3010 for display to the user 3130.

The cloud workers 3120 may periodically request current vehicle information from the data manager 3070 (e.g., polling). The data manager 3070, in turn, may access current vehicle information from vehicles that are active in the vehicle transportation network, and may update the streaming database 3080 and the historical database 3060 with the current vehicle information. In some implementations, the cloud workers 3120 may include a metrics calculator for updating the streaming database 3080 and the historical database 3060 (e.g., for calculating data from sensor data received from a vehicle, such as sensor data from the sensors 1360).

In some implementations, a current vehicle that is active in the vehicle transportation network, such as the vehicle 3030, may use a dedicated network connection, such as 4G or 5G connection integrated with the vehicle, for communicating current vehicle information. In some implementations, the current vehicle may use a user's device (e.g., a smartphone, tablet, or other computer associated with the user 3130) as source of network connection. In some implementations, the vehicle may provide precise location information and access credentials, while queries may be routed via the user's device.

Figure 4:
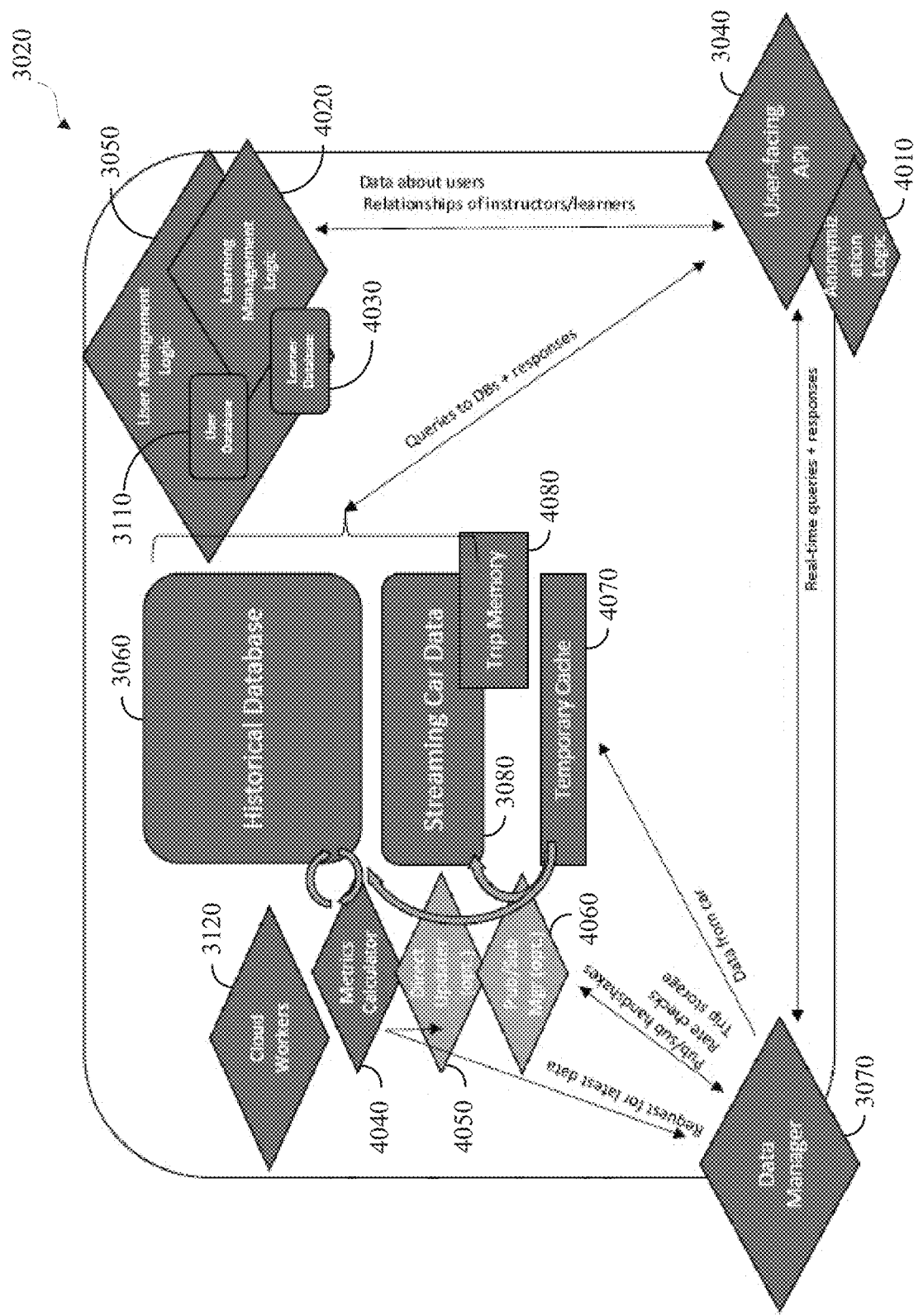
FIG. 4 is a block diagram of an example of a cloud system for determining responses to user requests with vehicle information to enable learning.

FIG. 4 is a block diagram of an example of the cloud system 3020. The user-facing API 3040 may receive (e.g., from the user 3130) information including a user identity, a user authentication, a user request. The user-facing API 3040 may send (e.g., to the user 3130) a response including data. The user-facing API 3040 may invoke anonymization logic 4010 to anonymize the user, the historical vehicle information, and/or the current vehicle information. For example, the anonymization logic 4010 may anonymize a current data element from current vehicle information by removing an identification of the current vehicle (e.g., a vehicle identification number (VIN)) associated with the current data element before returning the response. In some implementations, the anonymization logic 4010 may enable granting access to authorized users based on statuses of users as indicated in the user database 3110.

The user management logic 3050 may be used to determine whether a user request is generated by a user having a lower level of access or a higher level of access to vehicle information. For example, an owner or operator of a vehicle may have the higher level access, whereas a non-owner or non-operator of the vehicle may have the lower level access.

The user management logic 3050 may contain user-management features that are not specific to the education use-cases. The user management logic 3050 may be used to associate users with identifiers of vehicles (e.g., VIN) that the users are allowed to track, and levels of detail that the users are allowed to access. In some cases, the user management logic 3050 may be reduced or avoided by anonymizing data with rotating IDs when users make queries. The user management logic 3050 may store users who have been able to authenticate ownership of a particular vehicle so that the users can control privacy settings and grant access to specific other users. In some cases, the user management logic 3050 may manage user authentication and passwords (e.g., to allow this process).

The user management logic 3050 may communicate with learning management logic 4020. The learning management logic 4020 may enable grouping users together, for example, to enable communications between users based on their groups (e.g., the grouping or group). The learning management logic 4020 may utilize one or more additional databases for its operation, such as a learner database 4030 indicating the groups.

The learning management logic 4020 may provide additional logic components to handle managing learning, learners, and teams of learners. From an application side, this may include storing in a database or set of databases: teams of learners (classes) and instructors for those teams who have access to the activities of members of those classes; project groups (if any) assigned by the instructor, who are given temporary authority to view each other's activities on the platform; current view and activity of the learners; and/or historical records of learner activities (e.g., storing clicks, searches, time viewing), such as in a dedicated database due to the size of data involved. The learning management logic 4020 may also generate metrics based on those learner activities, and may respond to instructor queries with a learning dashboard that tracks student progress. The learning management logic 4020 may also send data to learners about the activities of classmates (e.g., in a same group) to allow for group work (e.g., to the extent a project group may be assigned by the instructor). The learning management logic 4020 may also access the learner database 4030, which may store information about who is an instructor, who is a learner, and group membership. The learners may be users based on the user management logic 3050, and not all users need to be learners.

The cloud workers 3120 may include a metrics calculator 4040, a direct updater 4050, and/or a publisher/subscriber manager 4060. The metrics calculator 4040 may enable updating one or more tables when one or more other tables are updated. The metrics calculator 4040 may perform calculations to update tables. For example, the metrics calculator 4040 may process sensor data (e.g., images, sounds, people, objects, temperatures, pressures, humidity, ambient light, locations, distances, speeds, and times) from a vehicle to generate the historical data element or the current data element (e.g., trip length for a trip, weather conditions, or traffic conditions). The calculations could be summary statistics that are stored. The metrics calculator 4040 may enable consistency of data in the historical database 3060. The direct updater 4050 may optionally be used to push to the historical database 3060 data from a temporary cache 4070 (e.g., streamed by the data manager 3070), to the extent such data is not already pushed directly by data manager 3070. The publisher/subscriber manager 4060 may optionally provide periodic updates of current position, to the extent such updates are not already provided directly by data manager 3070. The publisher/subscriber manager 4060 may also check on rates and/or updates with the data manager 3070. The publisher/subscriber manager 4060 may also implement publisher/subscriber handshaking with the data manager 3070. For example, a handshake could include a determination, associated with a vehicle, as to whether a trip by the vehicle is associated with a same trip or a new trip. The trip could be stored in a trip memory 4080 for purposes of trip analytics.

Thus, the metrics calculator 4040 may take data from the database and generate other data entries from that data (e.g., taking raw counts and turning them into averages). The direct updater 4050 may take data from the temporary cache 4070 and loads the data into the database. In some cases, this task may be performed directly by the data manager 3070. The publisher/subscriber manager 4060 may manage the connections between vehicles in the field and the database. In some cases, this task may also be performed by the data manager 3070.

In some implementations, part of managing connections with vehicles may include identifying trips. The publisher/subscriber manager 4060 can store a notion of a trip so that if a data-stream is disconnected (e.g., due to a drop in wireless signal), data from the two parts can be connected. However, if the vehicle is turned off and turned on again some amount of time later that exceeds a threshold, the two parts of data can be logged as separate trips. Aside from the time of a loss in signal, other data that may be used to estimate a trip may include destinations programmed in navigation system (e.g., via an in-vehicle infotainment (IVI)

system or the user's connected devices), messages from the vehicle corresponding to whether the vehicle was turned off, and/or a location of where the vehicle was stopped (e.g., a predetermined location, such as a home or gas station). A trip estimate could be revised, for example, by the metrics calculator 4040.

In some implementations, the metrics calculator 4040 may run continuously on a loop, processing most recent data and generating outputs. Outputs may include historical summaries of trends, new reduced-fidelity data tables based on raw data (e.g., for anonymity, or reduced bandwidth usage), data synthesized from a vehicle information table or other vehicle responses (e.g., the number of trips on a certain day, or in a given area), and entire new data tables that are combinations of multiple data tables populated by the data manager 3070. The metrics calculator 4040 may track a list of data types to update, with frequencies with which to update them and a measure of importance of accuracy. Thus, a data type may be updated at a specified frequency or rate. In the case of data types where accuracy is important, and where an update has not been made to the underlying data source for some time, the metrics calculator 4040 can request to the data manager 3070 (or the direct updater 4050) to flush the cache of most recent data and process those updates to the database, before the metrics calculator 4040 performs computations. Alternatively, the metrics calculator 4040 can proceed with the latest available data.

The data manager 3070 may enable the user 3130, via the HMI, to access vehicle availability to determine a list of current vehicles that are active in the vehicle transportation network. The data manager 3070 may subscribe to vehicles to receive current vehicle information and may publish current vehicle information to the streaming database 3080 and the historical database 3060. The data manager 3070 store data from a vehicle in the temporary cache 4070, and may implement publisher/subscriber handshaking with the publisher/subscriber manager 4060. The data manager 3070 may also enable requests for data, and associated with replies, based on user requests. The data manager 3070 may implement a media pipe for real-time information.

Thus, the data manager 3070 may manage publisher/subscriber arrangements with vehicles, or otherwise formulating requests to vehicles for data, and may process data returned from vehicles to be stored in a database or delivered to a user. A request for vehicle data could be generated, for example, by the user-facing API 3040 (e.g., a specific request from the user 3130, via the HMI 3010), the data manager 3070 (e.g., to ensure database is up-to-date in case of a time delay), or the metrics calculator 4040 (e.g., to ensure data is up-to-date for a calculation).

Regularly published data from vehicles may be handled by the data manager 3070 and held in the temporary cache 4070 until the data can be pushed in a batch to a database. The data manager 3070 may confirm receipt of data to a vehicle when an update is received. The data manager 3070 may also perform error correction if multiple conflicting messages are received. In cases where accuracy is more important, the data manager 3070 could confirm receipt with a checksum (e.g., MD5 or other checksum) in addition to an acknowledgement or OK message (e.g., an HTML Status 200 message) to ensure data integrity and receipt.

The data manager 3070 may also run a process continuously, on a loop, to check that data is published on time. The data manager 3070 can make a direct request for up-to-date information from each vehicle connected to the cloud system 3020 if publishing fails to occur. An agreed upon timing of data publishing may be stored in a real time data table associated with a vehicle ID (e.g., the current vehicle information). Thus, the cloud system 3020 can determine whether a transmission for data is late.

The data received from a vehicle may (e.g., current vehicle information) be used to: update the real-time database (e.g., the streaming database 3080) with locations of vehicles in the field; and/or update the stored data database (e.g., the historical database 3060) with new data (e.g., updating the historical vehicle information). Updating the real-time database may include passing newly returned locations to the streaming database 3080. Updating the stored data database may include the data manager 3070 holding data for intermittent updates of the data tables (e.g., a longer-term internal cache). In some cases, the metrics calculator 4040 can request flushes of this cache to the database.

The data manager 3070 may make requests to a particular vehicle, such as to open a stream/pipe of the current vehicle information over the communications network (e.g., for delivery to the user via the HMI 3010), or to send a digest of changed vehicle information since a last update at an appropriate level of detail (e.g., when publishing has failed). This digest can include, for example, the number of sensed vehicles or pedestrians in a vicinity, or raw data, such as lane line positions, object positions and bounding boxes, and raw sensor images. In some cases, data can be sent uncompressed, and in other cases, data may be sent compressed (e.g., sending a difference from a previous reading). Based on receipt of the data digest, the data manager 3070 may process the returned data (e.g., the current vehicle information) to the temporary cache 4070, in a particular format for updating to a particular location in the database, either directly or by a cloud worker. The format may enable identifying the data types that are returned. The data manager 3070 may store links between data types and the database tables that they update, and thus may identify the tables to update (e.g., it may identify the granularity and data formats of those tables using their metadata). The data manager 3070 may unpack compressed data, or translates storage formats to match from the transit data type from the vehicle to the format of the database. In some implementations, based on the database table type, the data manager 3070 may insert raw returned data as an entry in the table, or may batch or stage multiple updates at once and cache them before writing to the database (e.g., if the data table is intended to contain hourly averages as a finest grained unit, the data manager 3070 may cache an hour's worth of data for one update). In some implementations, the data manager 3070 may trigger a database write to update the database to the new state, or may trigger a cloud worker to perform the update.

The data types may include, for example, map data, weather data, images, sensor data, and trip length. The historical data elements and the current data elements may be received, stored, searched, and/or transmitted based on their data types. In some implementations, historical data elements stored in the historical database 3060 may be distributed to different classes of storage or storage media, such as according to access importance and/or timescale. For example, the historical database 3060 could use a relatively faster storage (e.g., disk) for common queries and recent information, and a relatively slower storage (e.g., tape) for older information.

Figure 5:
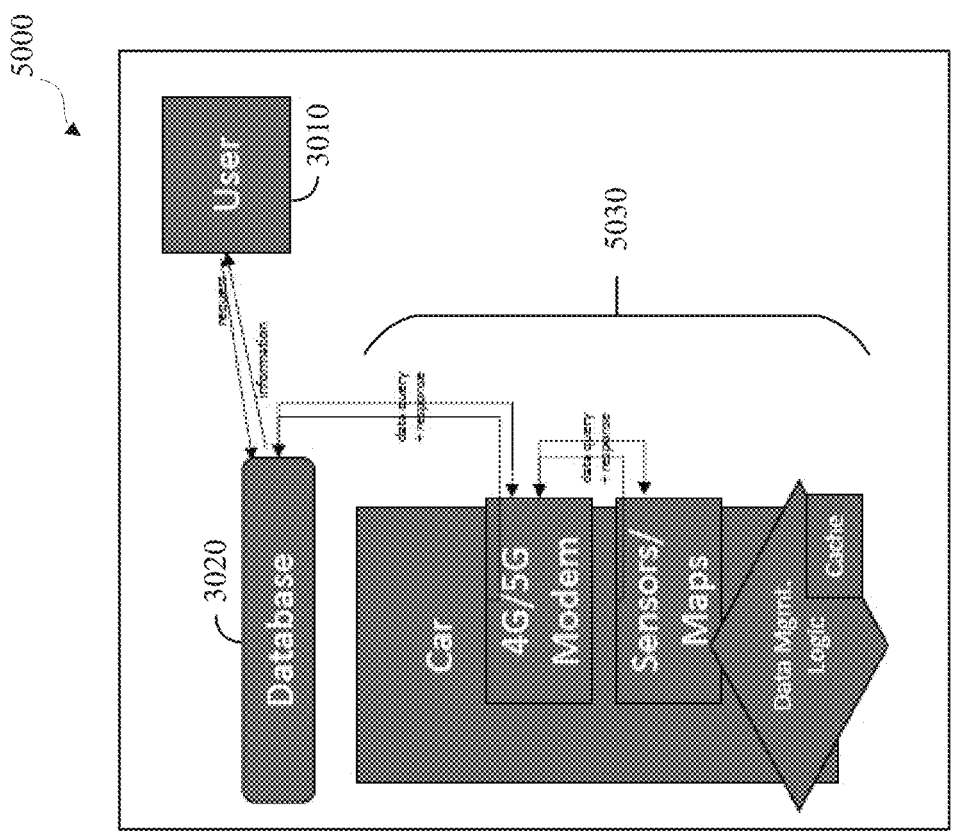
FIG. 5 is a block diagram of a first example of a vehicle system for determining responses to user requests with vehicle information to enable learning.

FIG. 5 is a block diagram of a first example of a vehicle system 5000 for determining responses to user requests with vehicle information to enable learning. The vehicle system 5000 is an example of a learning platform system on a vehicle 5030 in which interactions may occur on the vehicle 5030. The vehicle 5030 may include a communications system, sensors/maps, data management logic, and cache. The cache may store a log of recent data, such as images and sensor data. The user 3130, which may be remote from the vehicle 5030 (e.g., in another vehicle, or in an office, classroom, or other environment in the world) can communicate with the cloud system 3020, such as by sending a user request. The cloud system 3020 can communicate with the vehicle 5030 (e.g., via the communications network 2300) to obtain vehicle information associated with the vehicle 5030 (compressed and/or encrypted), which may be useable for a response to the user request (which may include current or historical vehicle information). This may enable the user 3130 to learn about a location in the world via the vehicle 5030, with the vehicle 5030 operating independently, without relying on a passenger's device.

Figure 6:
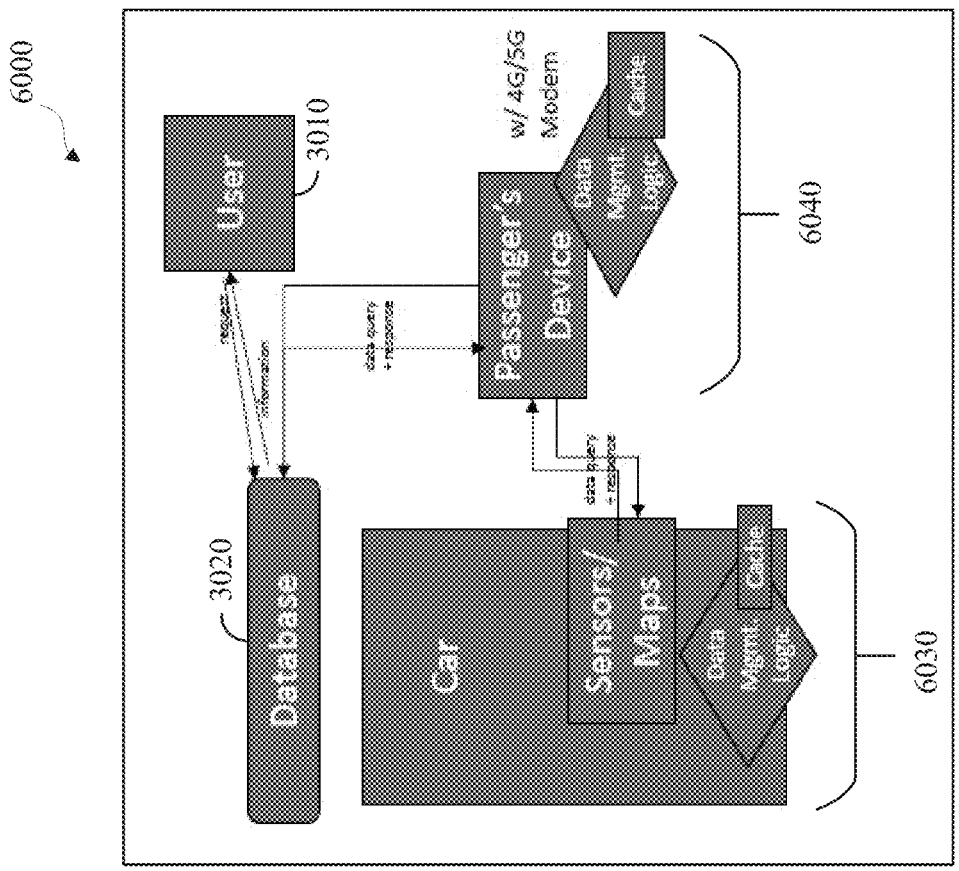
FIG. 6 is a block diagram of a second example of a vehicle system for determining responses to user requests with vehicle information to enable learning.

FIG. 6 is a block diagram of a second example of a vehicle system 6000 for determining responses to user requests with vehicle information to enable learning. The vehicle system 6000 is an example of a learning platform system on a vehicle 6030 in which a passenger's device 6040 (e.g., associated with a passenger in the vehicle 6030, which passenger could be another user of the cloud system 3020) may provide a network connection (e.g., via the communications network 2300) for the vehicle 6030. The vehicle 6030 may include sensors/maps, data management logic, and cache. The cache may store a log of recent data, such as images and sensor data. An application on the passenger's device 6040 may include a communications system, sensors/maps, data management logic, and cache. The user 3130, which may be remote from the vehicle 6030 and the passenger (e.g., in another vehicle, or in an office, classroom, or other environment in the world) can communicate with the cloud system 3020, such as by sending a user request. The cloud system 3020 can communicate with the vehicle 6030, via the passenger's device 6040 communicating locally with the vehicle 6030, to obtain vehicle information associated with the vehicle 6030 (compressed and/or encrypted), which may be useable for a response to the user request (which may include current or historical vehicle information). This may enable the user 3130 to learn about a location in the world via the vehicle 6030, with the vehicle 6030 operating in conjunction with the passenger's device 6040.

Thus, the vehicle system 5000 and the vehicle system 6000 may enable generating a media pipe to send high-bandwidth real time data to the cloud system 3020. In some implementations, the data management logic of the vehicle 5030 and/or the vehicle 6030 may 6030 may implement logic to select a data rate and/or importance for determining which data to send immediately and which data to cache for later transmission. For example, the determination could be based on availability of a network connection, such as sending position updates of the vehicle regularly while saving images for sending when Wi-Fi is available. The logic may also enable re-sending updates to the cloud system 3020 if a message receipt confirmation is not received within a predetermined time. In some implementations, the data management logic may enable determining summary statistics from data stored in cache to reduce load on the cloud system 3020 (e.g., a cloud worker, such as the metrics calculator 4040). For example, the data management logic may calculate counts of vehicles seen per minute, as well as uploading images of detected vehicles, to reduce load on the cloud system 3020.

FIG. 7 is an example of current vehicle information in a database format 7000. The current vehicle information may be real-time or close-to-real-time information from a current vehicle (e.g., the vehicle 3030, the vehicle 5030, or the vehicle 6030) which may be stored in the streaming database 3080 in the database format 7000. For example, the streaming database 3080 could store a list of current vehicles and recent vehicle geolocation (e.g., coordinates). A refresh or update rate for the current vehicle information can be set/adjusted (e.g., less than a second, or greater than 10 minutes), including based on factors such as desired bandwidth usage and privacy. The user-facing API 3040 can be configured to serve contents of the streaming database 3080 (e.g., the current vehicle information) to the user 3130. Further, the user-facing API 3040 can access availability to determine a list of current vehicles that are active in the vehicle transportation network. This may enable the user 3130 to view the locations of vehicles from which to draw vehicle information. In some implementations, the user-facing API 3040 can take a user request for a particular kind of vehicle information and automatically select relevant data from a vehicle in the area, using the stored list of current vehicles to find relevant vehicles.

The current vehicle information may be searchable based on parameters, such as an identification (e.g., VIN), geolocation, and/or sensor types of a vehicle (e.g., searching a listing of sensors available by a vehicle). As a result, the current vehicle information can be used to serve specific user requests by users for data. In some implementations, while a VIN may be a unique identifier stored in the streaming database 3080 (e.g., VIN1 corresponding to a first vehicle, and VIN2 corresponding to a second vehicle), users may optionally be served a rotating unique ID (UID) that may be valid for a session or a given slice of the current vehicle information. This may enable anonymizing the source the of the current vehicle information.

In some implementations, when a vehicle (e.g., the vehicle 3030, the vehicle 5030, or the vehicle 6030) connects to the cloud system 3020, the vehicle and the cloud system 3020 may agree upon an update rate associated with a publisher/subscriber arrangement for obtaining data. The update time stores time of last data receipt, used by Data Manager to identify if information is late. If late, data manager can try to ping the car directly, or report that data is out-of-date so user can be aware. If high accuracy is necessary, Data Manager can make direct request for data outside of regular publisher/subscriber schedule.

FIG. 8 is an example of historical vehicle information in a database format 8000. The historical vehicle information may be historical information from vehicles in the transportation network, which may be stored in the historical database 3060 in the database format 8000. The historical vehicle information may be stored in specialized file-formats relevant to a data type (e.g., map data, weather data, images, sensor data, and trip length, which could be based on map files, world-model object files, drive recordings, or sets of messages that are parts of drive recordings). The historical vehicle information may be stored with associated date ranges and/or time ranges corresponding to past data that can be queried. For example, map data could be stored with content, such as a map, map data, a geolocated region covered by the map, dates corresponding to when data was collected, and tags. The geolocated region could be represented, for example, by polygons of geocoordinates in degrees, or could be cross-referenced to another format such as a grid reference. The geolocated region could also be represented, for example, by a point and a radius. The tags can be used for various purposes, such as indicating data accuracy. In another example, sensor data could be stored with content, such as a world model, world model data, a geolocated region for a part of the world model, times corresponding to when data was collected, and tags.

The historical vehicle information may reference maps existing in various data formats, such as .OSM or .SHP. Other data may be stored in other formats, or specific applications of known formats, such as JSON (e.g., the world model data could include a list of objects where each object has an object type, object metadata such as color, object velocity and heading, and geolocations of objects). The data can be stored as a series of date stamped and/or time stamped messages with formats particular to the data type and application.

FIG. 9 is an example of requests and responses 9000 (e.g., types of user requests, and types of responses corresponding to the types of user requests). The user-facing API 3040 may receive the type of user request from the HMI 3010 and may transmit the type of response, corresponding to the type of user request, back to the HMI 3010. For example, a request to look at or browse available data types may cause a response that returns a manifest of available data types in the system; a request to look at vehicles from which data is available may cause a response that returns data from a real time data table; a request for data of a specific kind, including current vehicle information from a particular vehicle, may cause a request to be sent to the data manager 3070 to serve data from that vehicle, and a response to the user including a current data element from the streaming database 3080 when data from that vehicle received; another request for data of a specific kind, including historical vehicle information in the historical database 3060, collected on the server over time, may cause a response to the user that returns a historical data element from the historical database 3060.

Figure 10:
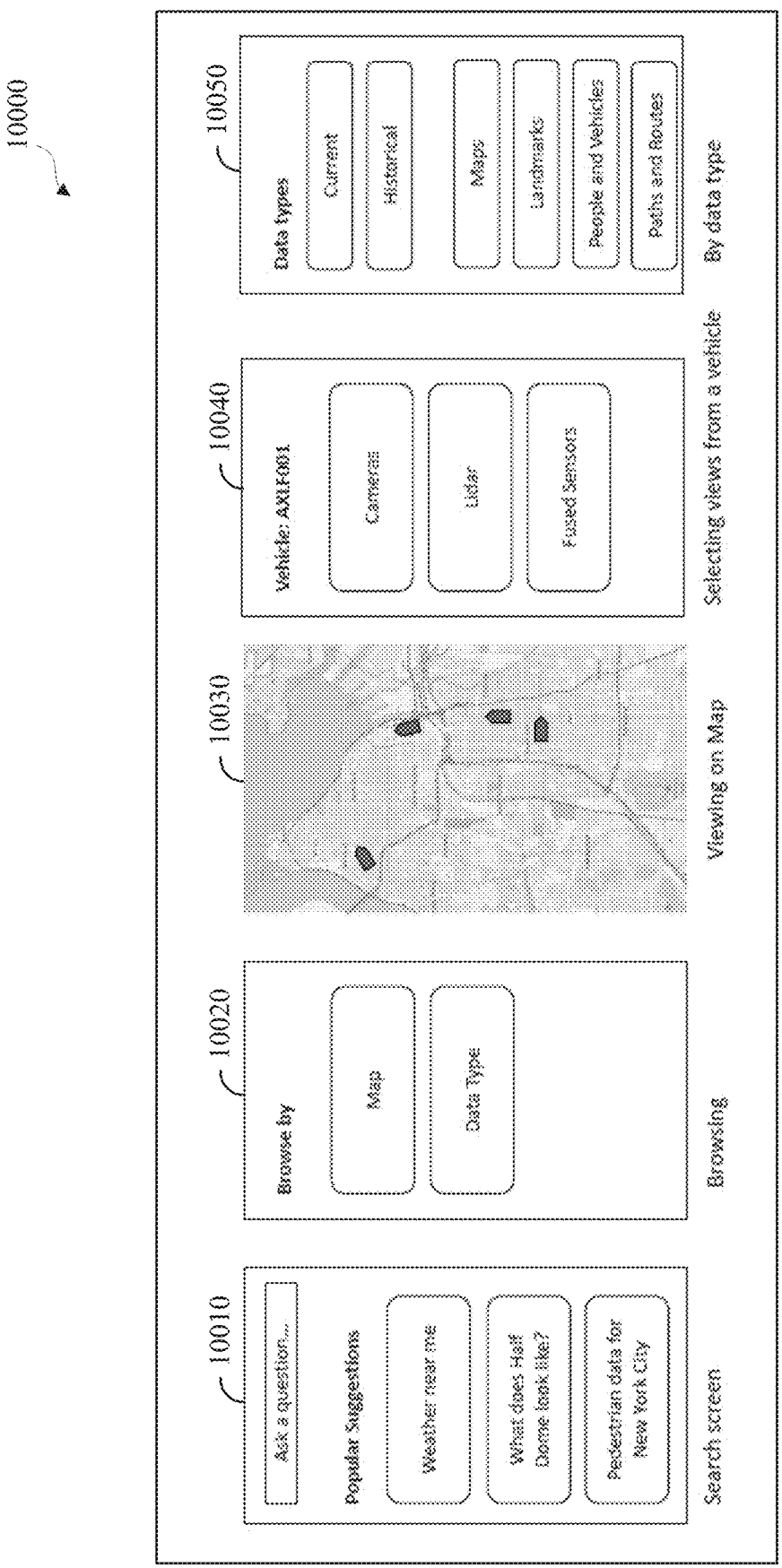
FIG. 10 is an illustration of an example of communicating via an HMI.

FIG. 10 is an illustration of an example of communicating 10000 via the HMI 3010. The HMI 3010 may display to the user 3130 various configurations of a graphical user interface (GUI), such as a search screen configuration 10010 (e.g., for receiving a natural language query, or receiving a selection of a predetermined query), a browsing configuration 10020 (e.g., for receiving an indication for browsing a map or a data type), a map configuration 10030 (e.g., for browsing a map, including current vehicles that are active in the vehicle transportation network), a sensor selection configuration 10040 (e.g., for browsing a vehicle's available sensors, such as vehicle with identifier "AXLF001," which may be shown on the map configuration 10030), and a data type selection configuration 10050 (e.g., for browsing available data types, such as a specific kind of data that is available real-time or current, or a specific kind of data that is historical). The configurations may present a searchable interface that allows the user 3130 to ask a natural language questions, search available data on a map, and/or view available data by data type. A natural language processing engine may be invoked (e.g., by the cloud system 3020, via the user-facing API 3040) to process natural language associated with the user request (e.g., "Ask a question . . . ") to identify, for example, place names and/or data types that are requested, and/or to generates database queries based on the user request. Browsing via the configurations may involve a tiered structure that allows the user 3130 to view different data accessible in different ways, such as by clicking on a vehicle on the map (e.g., the map configuration 10030) and looking through that vehicle's available sensors (e.g., the sensor selection configuration 10040), or by browsing data types and selecting a particular data types (e.g., the data type selection configuration 10050). Thus, the user 3130 can select a query in multiple ways, such as by timing (e.g., current vehicle information versus historical vehicle information) or data type (e.g., map data, such as landmarks, or weather data, or sensor data, such as data about people and vehicles, or trip length, such as data about routes, or raw sensor images).

In some implementations, content may be visualized by the user 3130 through multiple media. For example, 3D virtual reality (VR) goggles, and/or a display monitor, could be used by the user 3130 to view a data element from a vehicle. Thus, applications may be agnostic to output devices and may contain multiple presentation logics for different output devices. In some implementations, the user-facing API 3040 may be configured to allow for generation and upload of a variety of user generated content, such as comments from learners about the material, and other group (e.g., team or class) content, as specified herein. The content may be stored by learning management logic 4020 (e.g., the learner database 4030), and in some cases, can be linked to queries being shown or data being viewed, such as by storing a specific user query or unique ID corresponding to an item shown to the user 3130.

Figure 11:
FIG. 11 is an example of a query involving natural language processing.

In some implementations, the natural language processing engine may be configured to receive a user request and determine an appropriate database query based on the user request (e.g., the streaming database 3080 or the historical database 3060). For example, with additional reference to FIG. 11, an example of a query 11000 involving natural language processing may include the user 3130 entering the text "Show me pictures of Mt. Rainier." This may cause, for example, the cloud system 3020 to select from a table including images, and rows from the table such that the contents field contains "Mt. Rainier." The cloud system 3020 may also identify other possible interpretations, for instance by selecting images from a particular geocoordinate area that contain a mountain, or by selecting all images from a particular location point and orientation such that the mountain might be visible. The cloud system 3020 can show the user what is being searched for, and allow the user to select between multiple suggestions if available, or directly edit suggestions or terms (e.g., "I think you want to see . . . ").

In some implementations, the HMI 3010 could be implemented by a display device configured to view images, text, and video. For example, the display device could be the user's smartphone, or a school-issued laptop. The display device could enable an interaction that enables users to see content and obtain more details related to the content based on subjects of interest. For example, the user could tap on a screen, use a controller, or use a haptic glove. The user-facing interface could be integrated with the display device, as an overlay or drop-down menu, so the user can select and search items while viewing content. In some implementations, the display device may include an augmented reality (AR) or VR head-mounted display (HMD) which may be paired with the user's device. In such cases, the device could communicate with that display to show the content to the user.

In some implementations, a user may view a laptop or tablet and have multiple view options (e.g., data can be shown in a map viewer that allows the user to scroll, pan, and zoom; and/or data can be shown in a 3D viewer that also allows the user to "walk" around the map using arrow keys, or mouse, or joystick, or controller. In some implementations, raw data, or counts, can be visualized on the maps, summaries may be viewed in tables, time-series data can be graphed with a time axis, or time can be represented by a slider that changes 2D or 3D data as the slider is dragged. The user may select different views including looking at the map or looking at summary tables, depending on user interest. The user may be furnished with a language to specify new kinds of data displays, and/or the user may select from pre-set views configured by the application. In some implementations, where an HMD is used, data can be presented such that the user may look around using the device and sees the world outside of a particular vehicle as if the user were actually inside that vehicle. In some implementations, data may be presented in a variety of ways, such as colored regions, numbers or figures, lines of text, images, localized videos, and/or multimedia pages (e.g., HTML web pages). In some implementations, the user may receive options in the configuration of each individual data source/ data layer as to which of multiple possible representations is recommended (e.g., a continuous color scale, discrete color scale, numerical data, or no numerical data). In some implementations, the user may receive options as to which display device the user would like to use (e.g., AR/VR via an HMD, or a smartphone presentation) and the level of detail of information the user would like to receive. In some implementations, the display logic may be configured on the user side. For example, the HMI may be configured to accept data from the cloud system 3020 and visualize the data in an appropriate manner depending on the data types returned.

Figure 13:
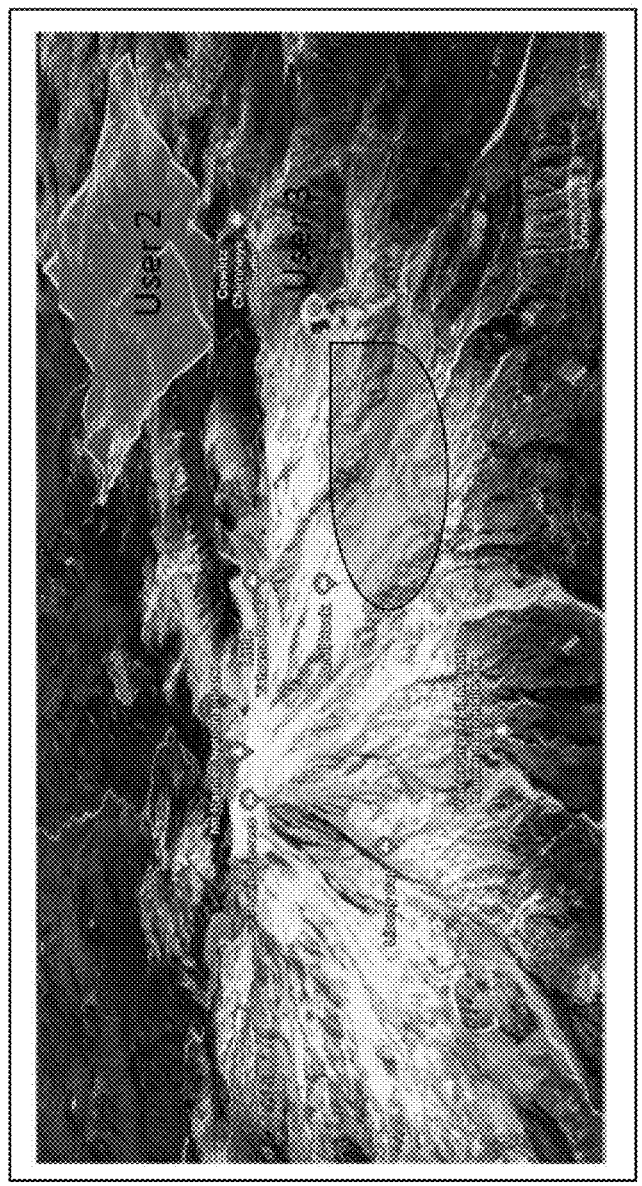
FIG. 13 is a second example of using map data.
Figure 12:
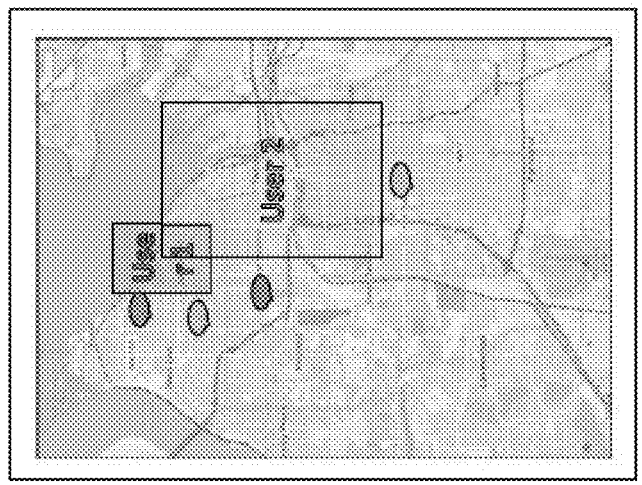
FIG. 12 is a first example of using map data.

In some implementations, multiple users within a group (e.g., a team or class) may collaboratively view the same content using their different devices. In such cases, an additional local data layer may be added by the device that is serving the content, which may track user's interactions and allow for interactions between multiple parties. In some implementations, multiple parties in the vehicle can "see" what the other is doing (e.g., What content are they viewing? Where are they looking?). For example, this can be accomplished by each user receiving an avatar or virtual physical manifestation, or by highlighting a region of the user's gaze with a unique color (analogous to highlighting in a shared document editor). FIG. 12 is a first example of using map data 12000, for example, in a viewport based collaboration view that shows what other users are looking at in a GUI (which could be displayed to the HMI 3010). FIG. 13 is a second example of using map data 13000, for example, in a mixed reality collaboration view (e.g., some users in VR are shown as avatars, such as "user 3," while smartphone users are shown in abstract viewport-based mode, such as "user 2." In combination with these features, users in a vehicle could chat with one another within the cloud system 3020, in multiple possible ways including text or video chat room, and/or written or audiovisual notes that are spatialized within the virtual space and tagged to specific objects, locations, or bits of data.

In some cases, the user may be a learner in the vehicle (e.g., the user 3130 being a learner in the vehicle 3030, the vehicle 5030, or the vehicle 6030). When the user is a learner in the vehicle, a primary view of the sensor data may be from that learner's particular vehicle, and the learner can view data from any vehicle as though the learner were in a classroom (whether they administer the vehicle or not, by being in the vehicle the learner may be granted full access to the vehicle information for the time they are present). For example, the learner can ask questions or browse data in the vehicle, and the natural language processing and/or search suggestions may be modified based on the learner's position in the world and thus configured to focus on observations around the learner. In this case, the learner's device may also be connected through the vehicle's IVI system to the vehicle systems, so the learner can be associated with that vehicle, and so that location data from the vehicle can be used to narrow learner requests. In this case, the learner's device may also connect to other learner's devices local to the vehicle via the vehicle's network, and/or the learner may be automatically grouped by the learning management logic 4020 with other learners traveling in the same vehicle, to make it possible for those learners to collaborate.

In some cases, the user may be a teacher (e.g., the user 3130 being a teacher). When the user is a teacher, the teacher can also browse data as a learner, and the teacher may also receive an additional interface. The teacher's interface may additionally enable the teach to invite learners to join their "class," or invite new users to the system (e.g., via email, or SMS text); remove learners from their class; send messages/ prompts to learners; create discussion boards to host discussions between learners, and grant access to those boards; put learners into groups that can collaborate; set goals or assignments for groups or for individuals; view the activities of learners in real time; view the historical activities of learners; and/or view summaries of the activities of learners, progress toward goals, or assignments. In some implementations, the learner interfaces also enable joining groups when invited; leaving groups; sending messages to learners in their groups; responding to prompts/assignments; and/or contributing to discussion boards of which they are member.

In some cases, the user may be a vehicle administrator (e.g., the user 3130 being a vehicle administrator). Assignment of a vehicle administrator may be managed by the user management logic 3050 as another kind of user (e.g., like assignment of a learner or a teacher). A user may authenticate with a vehicle using a unique code, entered into the vehicle IVI, in the presence of the vehicle key, or some other method of authentication to ensure that the user is authorized to manage that vehicle's data. A vehicle administrator can then access an interface that enables the user to control the visibility of vehicle information that is sent by that vehicle (e.g., the current vehicle information). The vehicle administrator may have privileged access and may fully view vehicle information from that vehicle without anonymization. The vehicle administrator can assign other users to also have privileged access to the vehicle information from that vehicle, for certain periods of time or indefinitely. A user can be both a vehicle administrator and a teacher (or a learner).

Figure 14:
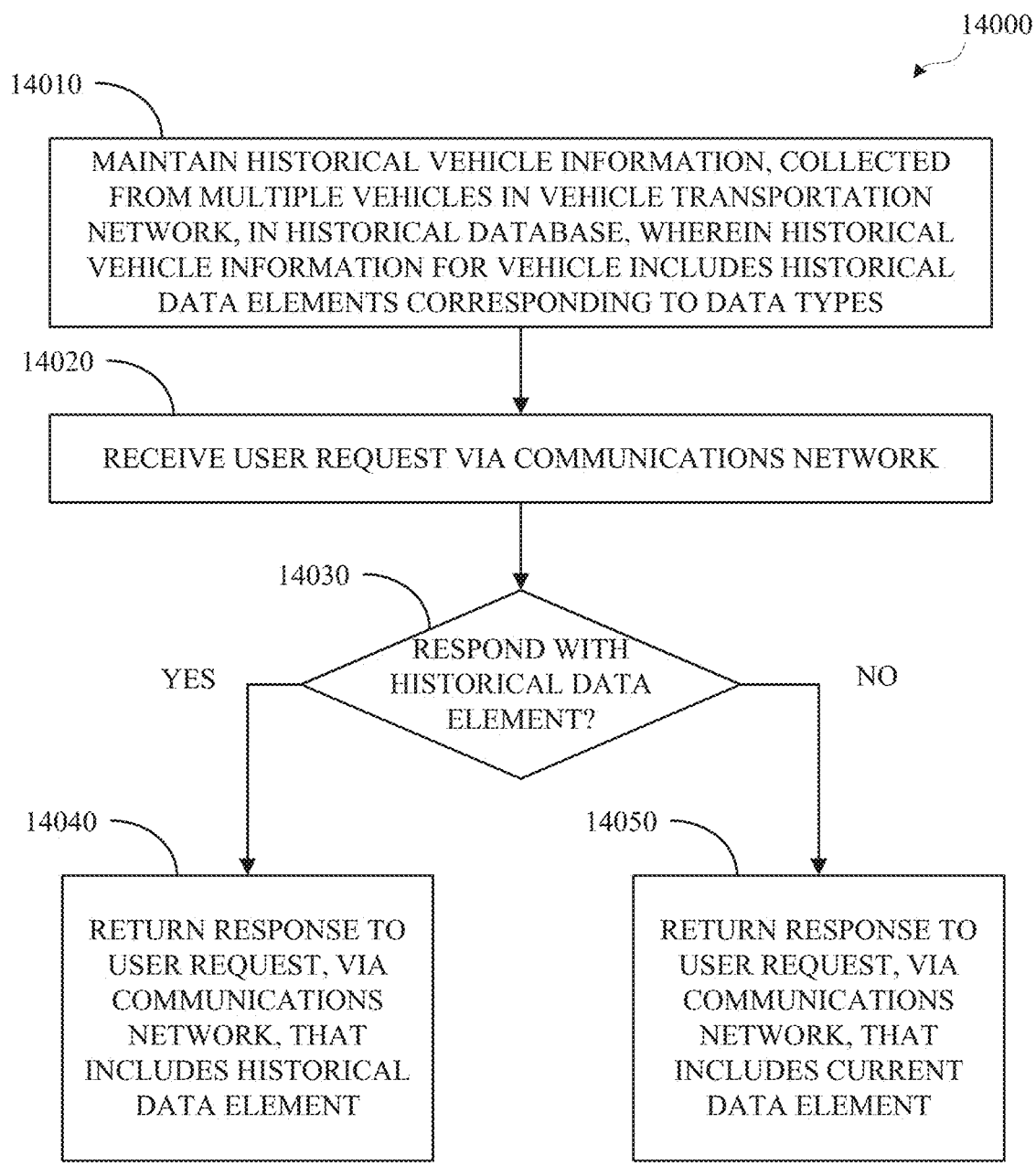
FIG. 14 is a flowchart of an example of a process for determining responses to user requests with vehicle information to enable learning.

To further describe some implementations in greater detail, reference is next made to examples of techniques which may be performed by or using a system for determining responses to user requests with vehicle information to enable learning. FIG. 14 is a flowchart of an example of a process 14000 for determining a response. The process 14000 can be executed using computing devices, such as the systems, hardware, and software described with respect to FIGS. 1-13. The process 14000 can be performed, for example, by executing a machine-readable program or other computer-executable instructions, such as routines, instructions, programs, or other code. The steps, or operations, of the process 14000 or another technique, method, process, or algorithm described in connection with the implementations disclosed herein can be implemented directly in hardware, firmware, software executed by hardware, circuitry, or a combination thereof.

For simplicity of explanation, the process 14000 is depicted and described herein as a series of steps or operations. However, the steps or operations in accordance with this disclosure can occur in various orders and/or concurrently. Additionally, other steps or operations not presented and described herein may be used. Furthermore, not all illustrated steps or operations may be required to implement a technique in accordance with the disclosed subject matter.

At 14010, a system (e.g., the cloud system 3020) can maintain historical vehicle information (e.g., the historical vehicle information) in a historical database (e.g., the historical database 3060). The historical vehicle information may be collected from multiple vehicles in a vehicle transportation network, such as a fleet of vehicles that are connected to the system network (e.g., vehicles like the vehicle 3030, the vehicle 5030, and/or the vehicle 6030). The historical vehicle information may be stored in the historical database. The historical vehicle information for a vehicle may include historical data elements corresponding to data types, such as map data, weather data, images, sensor data, and trip length.

At 14020, the system may receive a user request via a communications network (e.g., the communications network 2300). For example, the user request may be submitted by a user (e.g., the user 3130) via an HMI (e.g., the HMI 3010) which could be in a vehicle, office, classroom, or other environment.

At 14030, the system may determine, based on the user request, to respond with a historical data element from the historical database or a current data element from current vehicle information (e.g., the current vehicle information) collected from a current vehicle that is active in the vehicle transportation network (e.g., the vehicle 3030, the vehicle 5030, or the vehicle 6030). If the system determines to respond with a historical data element from the historical database ("Yes"), at 14040 the system may return a response to the user request, via the communications network, that includes the historical data element. However, at 14030, if the system determines not to respond with a historical data element from the historical database ("No"), but rather to respond a current data element from current vehicle information, at 14050 the system may return a response to the user request, via the communications network, that includes the current data element.

As used herein, the terminology "example", "embodiment", "implementation", "aspect", "feature", or "element" indicates serving as an example, instance, or illustration. Unless expressly indicated, any example, embodiment, implementation, aspect, feature, or element is independent of each other example, embodiment, implementation, aspect, feature, or element and may be used in combination with any other example, embodiment, implementation, aspect, feature, or element.

As used herein, the terminology "determine" and "identify", or any variations thereof, includes selecting, ascertaining, computing, looking up, receiving, determining, establishing, obtaining, or otherwise identifying or determining in any manner whatsoever using one or more of the devices shown and described herein.

As used herein, the terminology "or" is intended to mean an inclusive "or" rather than an exclusive "or". That is, unless specified otherwise, or clear from context, "X includes A or B" is intended to indicate any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

Further, for simplicity of explanation, although the figures and descriptions herein may include sequences or series of steps or stages, elements of the methods disclosed herein may occur in various orders or concurrently. Additionally, elements of the methods disclosed herein may occur with other elements not explicitly presented and described herein. Furthermore, not all elements of the methods described herein may be required to implement a method in accordance with this disclosure. Although aspects, features, and elements are described herein in particular combinations, each aspect, feature, or element may be used independently or in various combinations with or without other aspects, features, and elements.

The above-described aspects, examples, and implementations have been described in order to allow easy understanding of the disclosure are not limiting. On the contrary, the disclosure covers various modifications and equivalent arrangements included within the scope of the appended claims, which scope is to be accorded the broadest interpretation so as to encompass all such modifications and equivalent structure as is permitted under the law.

What is claimed is:

1. A method, comprising:
    maintaining historical vehicle information, collected from multiple vehicles in a vehicle transportation network, in a historical database, wherein historical vehicle information for a vehicle comprises historical data elements corresponding to data types;
    receiving a user request via a communications network, wherein the user request is received through a human machine interface (HMI) in a vehicle;
    determining, based on contents of the user request, whether to respond with a historical data element from the historical database or a current data element from current vehicle information collected from a current vehicle that is active in the vehicle transportation network; and
    returning a response to the user request via the communications network, wherein the response comprises the historical data element or the current data element that is determined based on the contents of the user request.

2. The method of claim 1, further comprising:
    accessing availability to determine a list of current vehicles that are active in the vehicle transportation network.

3. The method of claim 1, wherein the user request is generated by a first user, the method further comprising:
    grouping the first user with a second user; and
    enabling a communication between the first user and the second user based on the grouping.

4. The method of claim 1, wherein the user request is generated by a first user having a lower level of access to the current vehicle information, and wherein the current vehicle is associated with an operator having a higher level of access to the current vehicle information.

5. The method of claim 1, further comprising:
    anonymizing the current data element by removing an identification of the current vehicle associated with the current data element before returning the response.

6. The method of claim 1, further comprising:
    invoking a natural language processing engine to process the user request.

7. The method of claim 1, further comprising:
    identifying a query type associated with the user request, wherein a determination is based on the query type.

8. The method of claim 1, wherein the user request comprises a request for at least one of: browsing available data types; browsing current vehicles that are active in the vehicle transportation network; a specific kind of data that is current; or specific kind of data that is historical.

9. The method of claim 1, wherein the data types comprise map data, weather data, images, sensor data, and trip length.

10. The method of claim 1, further comprising:
processing sensor data about an environment from a vehicle of the multiple vehicles or the current vehicle to generate the historical data element or the current data element.

11. An apparatus, comprising:
a memory; and
a processor configured to execute instructions stored on the memory to:
maintain historical vehicle information, collected from multiple vehicles in a vehicle transportation network, in a historical database, wherein historical vehicle information for a vehicle comprises historical data elements corresponding to data types;
receive a user request via a communications network, wherein the user request is received through a human machine interface (HMI) in a vehicle;
determine, based on contents of the user request, whether to respond with a historical data element from the historical database or a current data element from current vehicle information collected from a current vehicle that is active in the vehicle transportation network; and
return a response to the user request via the communications network, wherein the response comprises the historical data element or the current data element that is determined based on the contents of the user request.

12. The apparatus of claim 11, wherein the processor is further configured to execute instructions stored in the memory to:
access vehicle availability to determine a list of current vehicles that are active in the vehicle transportation network.

13. The apparatus of claim 11, wherein the user request is generated by a first user, and the processor is further configured to execute instructions stored in the memory to:
group the first user with a second user; and
enable a communication between the first user and the second user based on the group.

14. The apparatus of claim 11, wherein the user request is generated by a first user having a lower level of access to the current vehicle information, and wherein the current vehicle is associated with an operator having a higher level of access to the current vehicle information.

15. The apparatus of claim 11, wherein the processor is further configured to execute instructions stored in the memory to:
anonymize the current data element by removing an identification of the current vehicle associated with the current data element before returning the response.

16. The apparatus of claim 11, wherein the processor is further configured to execute instructions stored in the memory to:
invoke a natural language processing engine to process the user request.

17. A system, comprising:
a fleet of vehicles in a vehicle transportation network;
a communications network; and
a server configured to execute instructions operable to cause one or more processors to perform operations comprising:
maintaining historical vehicle information, collected from multiple vehicles in a vehicle transportation network, in a historical database, wherein historical vehicle information for a vehicle comprises historical data elements corresponding to data types;
receiving a user request via the communications network;
determining, based on contents of the user request, whether to respond with a historical data element from the historical database or a current data element from current vehicle information collected from a current vehicle that is active in the vehicle transportation network; and
returning a response to the user request via the communications network, wherein the response comprises the historical data element or the current data element that is determined based on the contents of the user request.

18. The system of claim 17, wherein the user request is received through a human machine interface (HMI) configured in a vehicle.

19. The system of claim 17, wherein the operations further comprise:
identifying a query type associated with the user request, wherein a determination is based on the query type.

20. The system of claim 17, wherein the operations further comprise:
processing sensor data about an environment from a vehicle of the multiple vehicles or the current vehicle to generate the historical data element or the current data element.

* * * * *